United States Patent [19]

Jernigan

[11] 4,302,730
[45] Nov. 24, 1981

[54] CAVITY DUMPER

[75] Inventor: James L. Jernigan, Ridgecrest, Calif.

[73] Assignee: The United States of America as represented by the Secretary of the Navy, Washington, D.C.

[21] Appl. No.: 45,375

[22] Filed: Jun. 4, 1979

[51] Int. Cl.³ .................................................. H01S 3/08
[52] U.S. Cl. ............................ 331/94.5 C; 331/94.5 M; 331/94.5 D
[58] Field of Search .................. 331/94.5 CM, 94.5 S; 350/167

[56] References Cited

U.S. PATENT DOCUMENTS

| | | | |
|---|---|---|---|
| 3,504,299 | 3/1970 | Fox | 331/94.5 |
| 3,614,655 | 2/1963 | Bolger | 331/94.5 C |
| 3,804,490 | 4/1974 | Montgomery et al. | 350/167 |
| 3,879,686 | 4/1975 | Milan et al. | 331/94.5 M |
| 3,904,987 | 9/1975 | Cheng | 331/94.5 M |
| 3,918,007 | 11/1975 | Waksberg | 331/94.5 M |
| 3,973,216 | 8/1976 | Hughes et al. | 331/94.5 M |
| 3,992,681 | 11/1976 | Haun, Jr. et al. | 331/94.5 M |
| 3,995,231 | 11/1976 | Johnson et al. | 331/94.5 M |
| 4,044,316 | 8/1977 | Kennedy | 331/94.5 S |

OTHER PUBLICATIONS

"Mode Selection in Lasers" by P. W. Smith (An IEEE Article).
"Frequency Stabilization of a CW Dye Laser" by Grove et al.; *Proceed of Soc. of Photo-Optical Inst Engineers*, vol. 49, (Aug. 1974).

*Primary Examiner*—William L. Sikes
*Assistant Examiner*—León Scott, Jr.
*Attorney, Agent, or Firm*—R. S. Sciascia; W. Thom Skeer; Kenneth G. Pritchard

[57] ABSTRACT

A laser cavity dumper capable of building up energy at a given mode or wavelength while emitting light of a different wavelength is created through use of a Fox interferometer with an electro-optic cell. The Fox interferometer can have either of two configurations. Placement of the electro-optic cell in either of two locations for each of these configurations will either cause the oscillating modes for the laser cavity to scan or undergo discreet shifts of preferred modes. The Fox interferometer can be adjusted for zero output of a selected wavelength under normal operating conditions. A voltage change in the electro-optic cell then changes the resonance from the lossless state through the beam-splitter causing the cavity to dump. A new mode will begin to oscillate as the previous modes are depleted.

10 Claims, 6 Drawing Figures

CAVITY DUMPER

BACKGROUND OF THE INVENTION

1. Field of the Invention

This invention relates generally to lasing cavities, and more particularly to a system for dumping the resonant energy in such a cavity while other frequency modes are still resonating within that cavity.

2. Description of Prior Art

The use of both continuous and pulsed lasers are now well-known light generating devices. The main difference between continuous and pulsed lasers is the energy output for a given period of time. For pulsed lasers, which generally provide high energy output, an inherent limitation is the regeneration time of the laser while the resonating mode builds up between pulses. Previously, no lasers have been known which are capable of emitting a pulse of light while resonating in other modes.

Basic principles of mode selection in lasers can be found in the article "Mode Selection in Lasers" by P. W. Smith, Volume 60, Number 4, April 1972, pages 422–440 in Proceedings of the IEEE. The Smith article contains the description of the known reflection methods for oscillating light in a laser cavity and the respective emission spectrum that any given method of resonating provides. In particular, the Smith article discloses the emission characteristics when using either a Michelson or a Fox interferometer. As taught by Smith, the difference between these interferometers is the line width of the emitted light.

The use of a Michelson interferometer for controlling laser pulses in also well-known in the art as taught by U.S. Pat. No. 3,879,686 to Milam et al. The Milam et al. patent teaches using adjustments to the total path length difference between interferometer arms to control the laser pulse duration. U.S. Pat. No. 3,504,299 To A. G. Fox explains why a Fox interferometer has narrow bandwidth selection.

SUMMARY OF THE INVENTION

The present invention sets forth a laser cavity dumping system which can provide shorter times between laser pulses due to its ability to resonate at a mode different from which it is emitting the present output pulse.

The use of a Fox interferometer permits the emitted light pulses to be well-defined narrow bandwidths or well-defined modes of emitted light. By placing an electro-optical cell in the appropriate interferometric arm of the total optical path or the optical path directly from the lasing material, the mode selection can either be scanned or jumped. Thus, it can be seen that multiple pulses in different modes can be emitted by scanning voltage across the electro-optical cell.

DESCRIPTION OF THE PREFERRED EMBODIMENT

Figure 1:
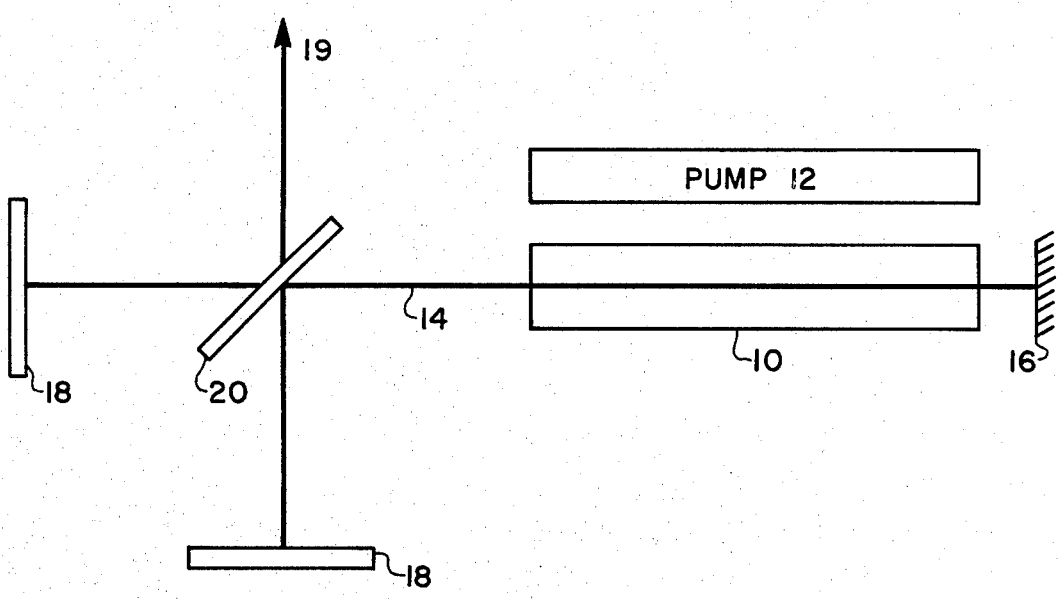
FIG. 1 is a prior art laser with a Michelson interferometer.

A prior art Michelson interferometer laser is shown in FIG. 1. Lasing material 10 is excited through any traditional pumping means 12, such as a flash tube arrangement. Light emitted from lasing material 10 will travel along an optical path 14 which is defined by a total reflective end 16 and some form of Q-switch which will control when the laser will emit light. In the figure as shown, the Q-switch is composed of a Michelson interferometer which is in turn composed of two fixed mirrors 18 and a beamsplitter 20. The mode selectivity of a Michelson interferometer varies sinusoidally with the frequency, thus, the device has a limited mode selection ability. The prior art device of FIG. 1 will emit a pulse of light whenever one of the mirrors is shifted in position. Beamsplitter 20 for a Michelson interferometer will have the reflectance, R, and transmittance, T, approximately equal. That is, $T=R=50\%$. The emitted light will travel along path 19. The mode spacing for a Michelson interferometer is $2(d_1 - d_2)$ where $d_1$ and $d_2$ are the distances of mirrors 18 from beamsplitter 20.

Figure 2:
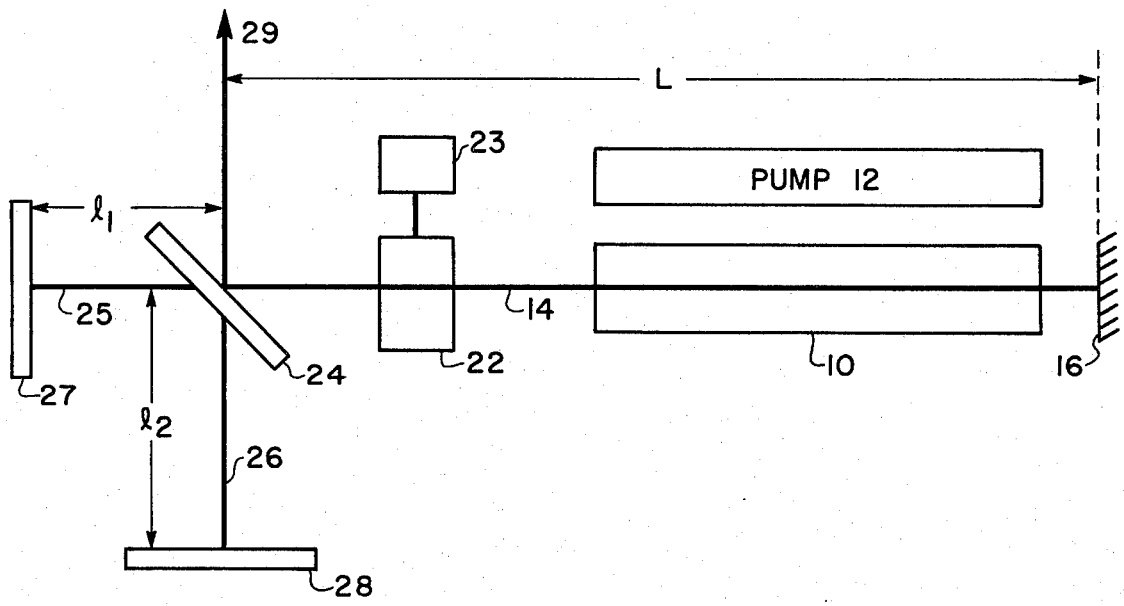
FIG. 2 is a diagram of the present invention using a Fox-Smith arrangement of mirrors.

In FIG. 2, a Fox interferometer is used to Q-switch the laser. A Fox interferometer differs from a Michelson interferometer in that the secondary mirrors 27 and 28 form a second resonating path. The secondary path in FIG. 2 has a reflection from beamsplitter 24. The configuration of mirrors and beamsplitter of FIG. 2 is also known as a Fox-Smith arrangement. Once again, the lasing material 10 and pumping means 12 can be any of the conventionally known materials which will emit light along an optical path 14. End mirror 16 is totally reflective and is adjustable. Light traveling along optical path 14 now passes through an electro-optical cell 22 before striking a beamsplitter 24 which is rotated 90° with respect to the orientation of the beamsplitter in a Michelson interferometer. Light passing through beamsplitter 24 is trapped by reflection between mirrors 27 and 28 via beamsplitter 24. Beamsplitter 24 has an R value of 60-80% with the corresponding T value of 20-40%. This path resonates light as a high Q resonant structure to reject any reflection of light off of beamsplitter 24 of light from the resonant structure formed by mirrors 16 and 27. Either of mirrors 16, 27 or 28 are adjusted until the output is zero under normal conditions. Whenever the voltage is changed on the electro-optic cell 22 by a voltage source 23, the cavity will no longer resonate in the lossless state through the beamsplitter. Voltage source 23 can also include a control section such as a minicomputer for changing modes in a predetermined sequence. Thus voltage source 23 serves as a means to drive electro-optic cell 22. The energy contained within the cavity will now tend to dump or pass through the beamsplitter until depleted. The length of time during which this pulse will occur may be regulated the same as in the Michelson interferometer discussed previously. However, when electro-optic cell 22 has a change in voltage, the Fox interferometer will now have a new mode at which it will begin to oscillate while the previous mode is being depleted. Electro-optic cell 22 can be a Pockels cell which has a different effective path length for each voltage setting.

Figure 3:
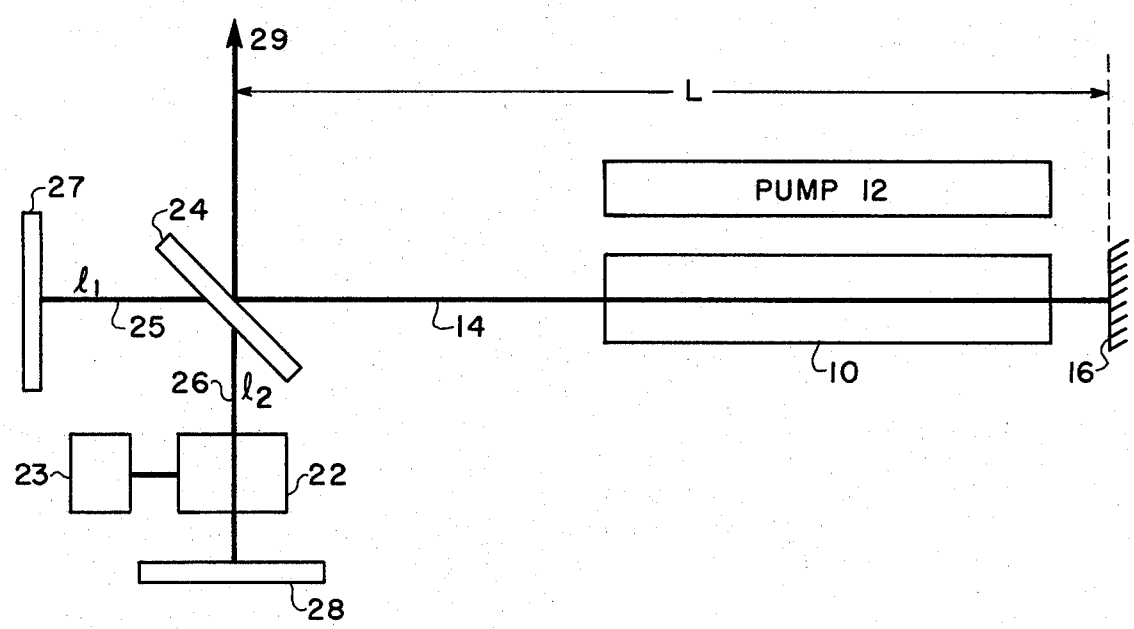
FIG. 3 is an alternate arrangement of the present invention using a Fox-Smith arrangement of mirrors.

A similar arrangement of the elements shown in FIG. 2 is shown in FIG. 3. The only difference between the figures is moving electro-optical cell 22 from the main optical path 14 to an interferometric leg 26. The pronounced effect caused by shifting the electro-optical cell from the main optical path to interferometer leg 26 will be shown further on. At this time it should be noted that the effect produced with electro-optic cell 22 in interferometric leg 26 is different from placing electro-optic cell 22 in interferometric leg 25.

Figure 4:
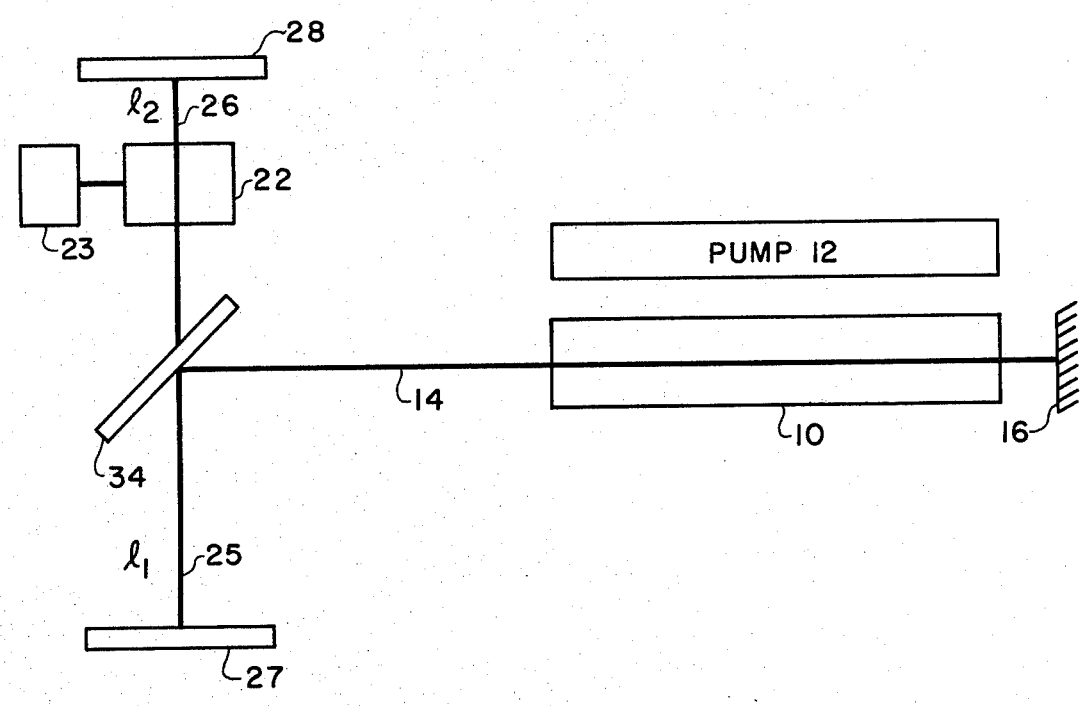
FIG. 4 is yet another diagram of the present invention using a T-arrangement of mirrors.

FIG. 4 shows yet a third embodiment of the present invention where the Fox interferometer has interferometric legs 25 and 26 forming a T to optical path 14 rather than the L-shape shown previously. This type of Fox interferometer is known as a T-arrangement of mirrors and beamsplitter. Beamsplitter 34, shown in FIG. 4 is rotated 90° as compared to FIGS. 2 and 3. In addition, the R and T values of beamsplitter 34 are reversed as compared to beamsplitter 24, T is 60–80% and R is 20–40%.

Figure 5:
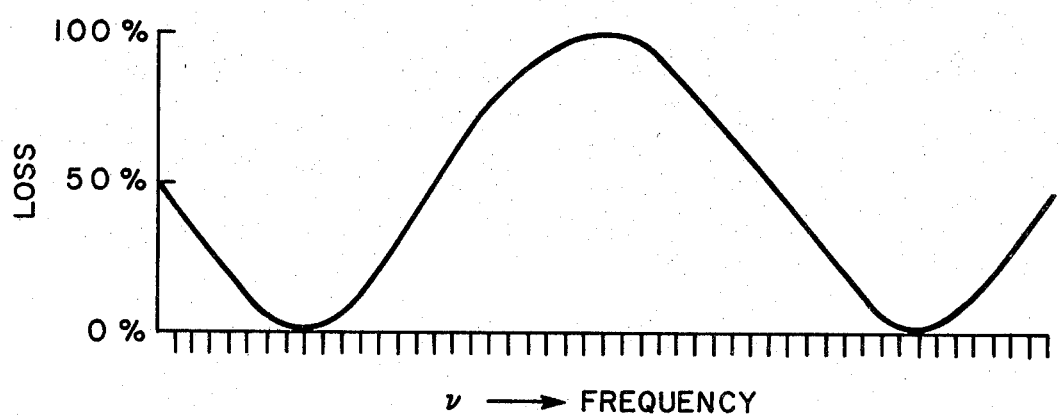
FIG. 5 is an example of the loss distribution of a laser with a Michelson interferometer.

FIG. 5 shows the percentage of loss of light in a typical Michelson interferometer as a function of frequency mode. This contrasts with FIG. 6 which shows the percentage of loss versus frequency mode for a Fox interferometer. As can be seen by comparing the two figures, the Michelson interferometer only has zero percent loss or 100 percent loss at a single point. For most modes the percentage of loss is an intermediate value. These modes are inefficient because they require longer times to build to a desired energy level. The emitted light covers a broad band.

Figure 6:
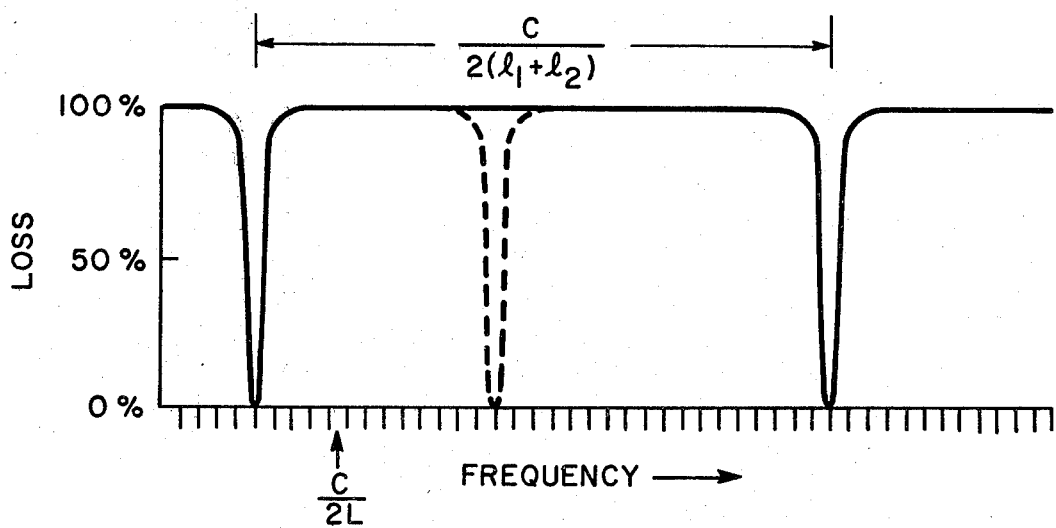
FIG. 6 is an example of the loss distribution of a laser with a Fox interferometer.

In FIG. 6, the Fox interferometer shows narrow spikes of resonance which is represented by 0% loss. Midway between these narrow spikes of resonance, the Fox interferometer undergoes 100% loss.

The mode spacing for the Fox interferometer is c/2L, where c represents the speed of light and L represents the length of the main optical path, which in FIGS. 2, 3 and 4 is the length of optical path 14 from beamsplitter 24 to total reflecting mirror 16. As can be seen from looking at the comparison of FIGS. 5 and 6, any shifting of modes for a Michelson interferometer requires a 180° degree phase shift to go from a true lossless state to a pure emission state. Any shifting of less than this amount or more than this amount results in an inefficient resonant condition of the lasing cavity. However, in the Fox interferometer, as shown in FIG. 6, almost any other frequency mode between the normal resonant modes can be reached. The space between resonant modes for a given configuration of the Fox interferometer is $$\frac{c}{2(l_1 + l_2)}.$$

If the electro-optical cell is in the main optical path length 14 as shown in FIG. 2, the changing of voltage on the electro-optical cell will cause the modes to selectively scan one by one and each mode separated by c/2L shown in FIG. 6 will be permitted to resonate. However, if the electro-optical cell is placed in interferometric leg 26 as shown in FIGS. 3 and 4, the resonance spike can be jumped a discreet number of modes to a new resonant mode as shown in FIG. 6 by the dotted line. If electro-optic cell 22 is placed in interferometric leg 25, it is changing the path length for both resonating paths. This complex changing of both at once is, in general, not desired. Thus, it can be seen, that a great deal of mode selection can be controlled by placing the electro-optical cell in one of the interferometric legs.

In summary, the function of the Fox interferometer can be considered a condition whereby all light emitted along optical path 14 is lost through beamsplitter 24 unless the ideal resonant conditions are met. Light, in one of the frequencies or modes undergoing a 100% loss, may never build up and always remains relatively weak background light. However, for the resonant modes present in the system, the light undergoes nearly 0% loss and builds to whatever level is desired. Upon shifting the voltage of the electro-optical cell, the effective path length changes causing the resonant modes to change instantaneously for the Fox interferometer. The new resonant modes begin to oscillate immediately. Light which has been built up in the previous resonant mode, is now be emitted from the Fox interferometer as a pulse of light. Thus, the period between pulses for light in the present invention is a function of the build up time for the strength of pulse required and the rate at which lasing material 10 is emitting light. Because the mode selection in the Fox interferometer is so narrow, pulses which are acceptable within a broad beam can use the present invention as one providing rapid pulses of nearly identical light, since the shift in frequency can be made as small as desired.

In summary, the present invention permits a laser to dump its specific axial modes while building up on others. The alignment of the laser cavity is relatively simple because this is a simpler form of dumping than previous methods which require greater numbers of optical components.

What is claimed is:

1. A cavity dumper for a laser resonant cavity comprising:
    lasing material for emitting a range of light wavelengths or modes along a main optical path of length L with two ends, said lasing material located between said ends;
    means in proximity to said lasing material for pumping said lasing material to an excited state where said light emission will occur;
    a total reflecting surface placed in said main optical path at one end of said laser resonant cavity for establishing a closed end to said main optical path;
    a Fox interferometer placed in said main optical path for operating a selective emission second end to said laser resonant cavity, said interferometer has two interferometric legs of length $l_1$, and $l_2$ at the second end of said main optical path such that two resonating paths of length, $L+l_1$, and $l_1+l_2$, exist, said resonating paths determinative of which wavelengths are emitted by said selective end of the resonant cavity and which wavelengths are contained along said resonating paths;
    a variable voltage source electrically connected to said electro-optic cell for changing the path length of at least one of said two resonating paths as the voltage is varied in a predetermined manner; and
    an electro-optic cell placed in said paths of length L, $l_1$, or $l_2$ in a predetermined manner, said variation changing the wavelengths emitted by said selective emission end of said laser resonant cavity and the wavelengths contained by the new combination of resonating paths.

2. A cavity dumper for a laser resonant cavity as described in claim 1 wherein the Fox interferometer comprises a Fox-Smith arrangement of mirrors and beamsplitter to said main optical path, such that said main optical path is subdivided into two interferometric legs.

3. A cavity dumper for a laser resonant cavity as described in claim 2 wherein said beamsplitter comprises a reflectivity, R, in the range of 60–80% and transmittance, T, equivalent to $1-R$ or 20–40%.

4. A cavity dumper for a laser resonant cavity as described in claim 1 wherein the Fox interferometer comprises a T-arrangement of mirrors and beamsplitter to said main optical path, such that said main optical path is subdivided into two interferometric legs.

5. A cavity dumper for a laser resonant cavity as described in claim 4 wherein said beamsplitter comprises a transmittance, T, in the range of 60–80% and reflectance, R, equivalent to $1-T$ or 20–40%.

6. A cavity dumper for a laser resonant cavity as described in claims 2, 3, 4 or 5 wherein said electro-optical cell is placed in said main optical cell.

7. A cavity dumper for a laser resonant cavity as described in claims 2, 3, 4 or 5 wherein said electro-optic cell is placed in interferometer leg $l_1$.

8. A cavity dumper for a laser resonant cavity as described in claims 2, 3, 4 or 5 wherein said electro-optical cell is placed in interferometric leg $l_2$.

9. A method for emitting light of a predetermined mode from an optical resonant cavity while said cavity is resonating in at least one other mode comprising the steps of:

emitting a beam of laser light along an optical path with one totally reflective end, said beam including a predetermined range of wavelengths;

subdividing said beam with a Fox interferometer such that two resonating paths exist along three segments that are identified as $l_1$, $l_2$ and L where $l_1$ and $l_2$ are one resonating path length formed by the two interferometric legs present in a Fox interferometer and where $L+l_1$ are the second resonating path length formed by one leg, $l_1$, of the Fox interferometer and the main optical path, L, which contains lasing material for said emitting step, whereby light resonating along path length $l_1+l_2$ interferes with light resonating along path length $L+l_1$, such that no output of light occurs for a selected spectrum of wavelengths, a mode, and wavelengths not in said spectrum, all other modes, are lost from the Fox interferometer and do not resonate;

placing a voltage regulated electro-optical cell in interferometric leg $l_2$ for changing the path length of interferometric leg $l_2$ to $l_2'$ in a known manner such that the interference pattern between resonating path length $L+l_1$ and $l_1+l_2'$ resonates a different spectrum of wavelengths, a new mode, and the previous resonating mode is emitted as a member of all other modes; and varying the voltage on said electro-optic cell to produce said predetermined change of path length in leg $l_2$.

10. A method for emitting light of a predetermined mode from an optical resonant cavity while said cavity is resonating in at least one other mode comprising the steps of:

emitting a beam of laser light along an optical path with one totally reflective end, said beam including a predetermined range of wavelengths, subdividing said beam with a Fox interferometer such that two resonating paths exist along three segments that are identified as $l_1$, $l_2$, and L where $l_1$ and $l_2$ are one resonating path length formed by the two interferometric legs present in a Fox interferometer and where $L+l_1$ are the second resonating path length formed by one leg, $l_1$, of the Fox interferometer and the main optical path, L, which contains lasing material for said emitting step, whereby light resonating along path length $l_1+l_2$ interferes with light resonating along path length $L+l_1$ such that no output of light occurs for a selected spectrum of wavelengths, a mode, and wavelengths not in said spectrum, all other modes, are lost from the Fox interferometer and do not resonate;

placing a voltage regulated electro-optical cell in non-interferometric leg L for changing the path length of non-interferometric leg L to L' in a known manner such that the interference pattern between resonating path lengths $L'+l_1$ and $l_1+l_2$ resonates a different spectrum of wavelengths, a new mode, and the previous resonating mode is emitted as a member of all other modes; and varying the voltage on said electro-optic cell to produce said predetermined change of path length in leg L.

* * * * *